United States Patent
Fritsch et al.

(10) Patent No.: US 7,201,542 B2
(45) Date of Patent: Apr. 10, 2007

(54) SOLID DRILL BIT FOR MACHINE TOOLS

(75) Inventors: Andree Fritsch, Freudental (DE); Hans Haidinger, Pleidelsheim (DE); Alexander Krause, Meimsheim (DE); Jacek Kruszynski, Stuttgart (DE); Helmut Morlok, Loechgau (DE); Frank Roeser, Gemmrigheim (DE); Henry Schuett, Sachsenheim (DE); Miltiadis Theodorou, Neckarwestheim (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 522 days.

(21) Appl. No.: 10/275,418

(22) PCT Filed: Apr. 6, 2001

(86) PCT No.: PCT/EP01/03923

§ 371 (c)(1),
(2), (4) Date: Apr. 7, 2003

(87) PCT Pub. No.: WO01/85375

PCT Pub. Date: Nov. 15, 2001

(65) Prior Publication Data

US 2003/0161696 A1    Aug. 28, 2003

(30) Foreign Application Priority Data

May 5, 2000    (DE) ................................. 100 21 879

(51) Int. Cl.
 *B23B 51/02* (2006.01)
 *B23B 51/00* (2006.01)
(52) U.S. Cl. ...................... 408/223; 408/224; 408/227; 408/713

(58) Field of Classification Search ................ 408/223, 408/224, 227, 713
See application file for complete search history.

(56) References Cited

U.S. PATENT DOCUMENTS

| | | | | |
|---|---|---|---|---|
| 3,963,365 A | * | 6/1976 | Shallenberger, Jr. | ........ 408/186 |
| 4,124,328 A | * | 11/1978 | Hopkins | ..................... 408/223 |
| 4,131,383 A | * | 12/1978 | Powers | ....................... 407/114 |
| 4,265,574 A | * | 5/1981 | Eckle | ............................. 408/188 |
| 4,367,991 A | * | 1/1983 | Grafe et al. | ................. 408/224 |

(Continued)

FOREIGN PATENT DOCUMENTS

DE    28 43 788    5/1979

(Continued)

*Primary Examiner*—Willmon Fridie, Jr.
(74) *Attorney, Agent, or Firm*—Flynn, Thiel, Boutell & Tanis, P.C.

(57) ABSTRACT

A solid drill bit for machine tools. has a bit body and two movable inserts located a radial distance apart in insert seats of the bit body. The inserts have a rectangular or quadratic contour, project axially over the bit body with their major cutting edges and overlap in their working area. The outer movable insert projects radially beyond the periphery of the bit body with its outer cutting edge corner and with the adjoining minor cutting edge. Starting from the cutting edge corner, the minor cutting edge is inclined in the direction of the bit body at a setting angle of less than 3.2 °. The minor cutting edge has a guiding edge that is slidingly supported against the wall of the bore over at least part of its length due to a radially outwardly oriented thrust force.

19 Claims, 3 Drawing Sheets

U.S. PATENT DOCUMENTS

| | | | |
|---|---|---|---|
| 4,563,113 A * | 1/1986 | Ebenhoch | 408/223 |
| 4,859,123 A | 8/1989 | Koesashi et al. | |
| 4,889,455 A * | 12/1989 | Karlsson et al. | 408/188 |
| 5,049,011 A * | 9/1991 | Bohnet et al. | 408/223 |
| 5,302,059 A * | 4/1994 | Fabiano | 408/223 |
| 5,509,761 A * | 4/1996 | Grossman et al. | 408/59 |
| 5,758,997 A | 6/1998 | Mealey et al. | |
| 5,782,587 A | 7/1998 | Basteck | |
| 5,788,431 A * | 8/1998 | Basteck | 408/229 |
| 5,848,861 A * | 12/1998 | Hansen | 408/143 |
| 6,039,515 A * | 3/2000 | Lamberg | 408/188 |
| 6,135,681 A * | 10/2000 | Nuzzi et al. | 408/227 |
| 6,224,300 B1 * | 5/2001 | Baxivanelis et al. | 407/114 |

FOREIGN PATENT DOCUMENTS

| | | |
|---|---|---|
| DE | 42 39 234 | 6/1994 |
| DE | 197 10 997 | 9/1998 |
| JP | 60 104604 | 6/1985 |

* cited by examiner

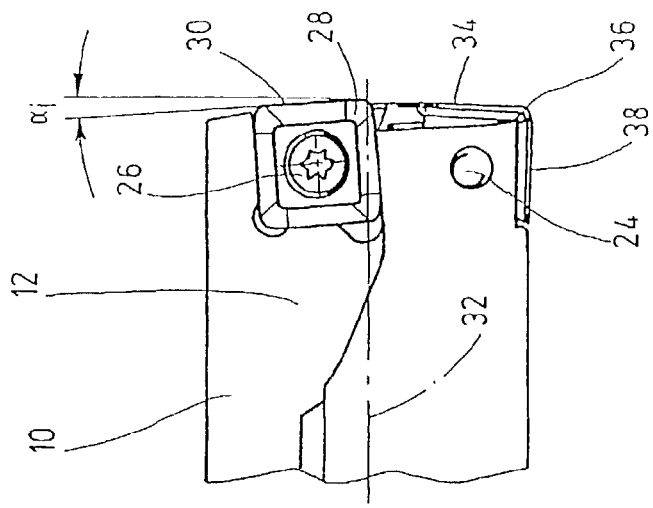
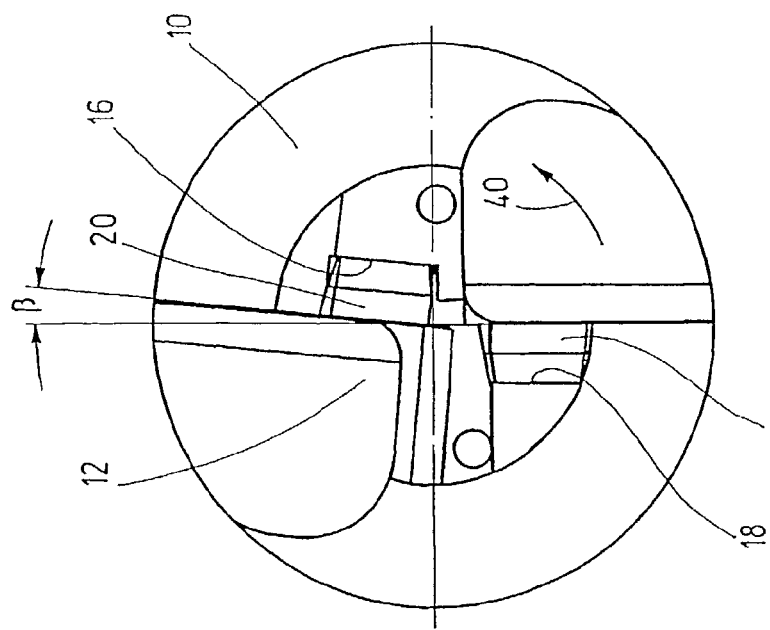
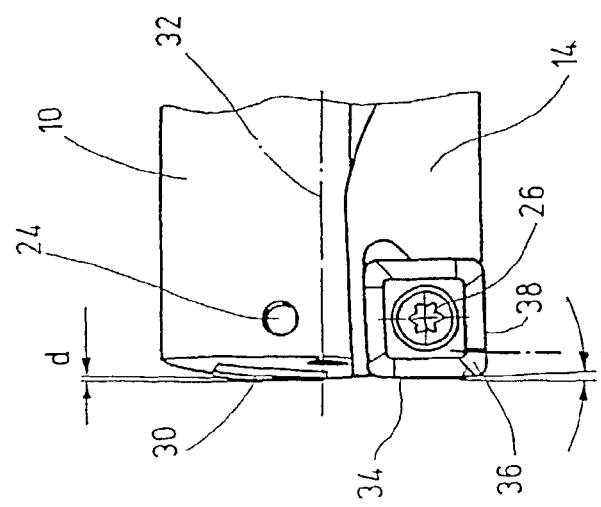

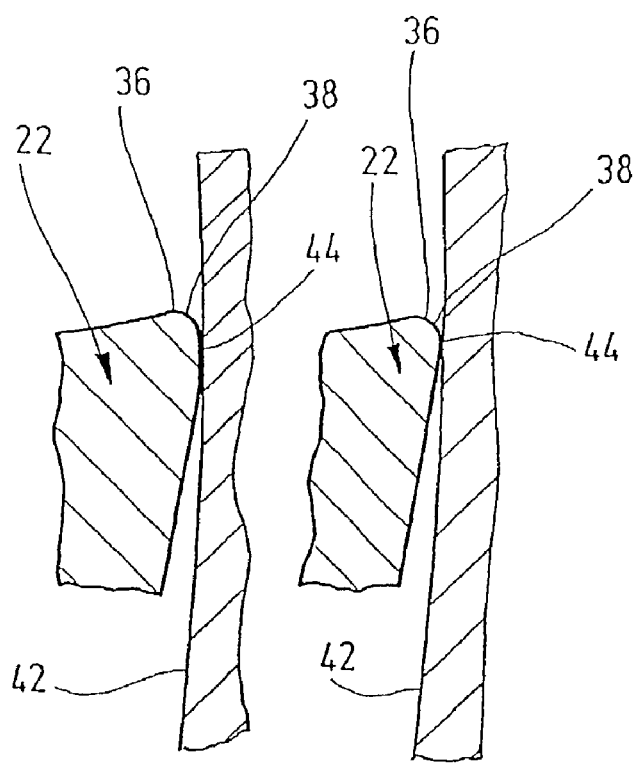
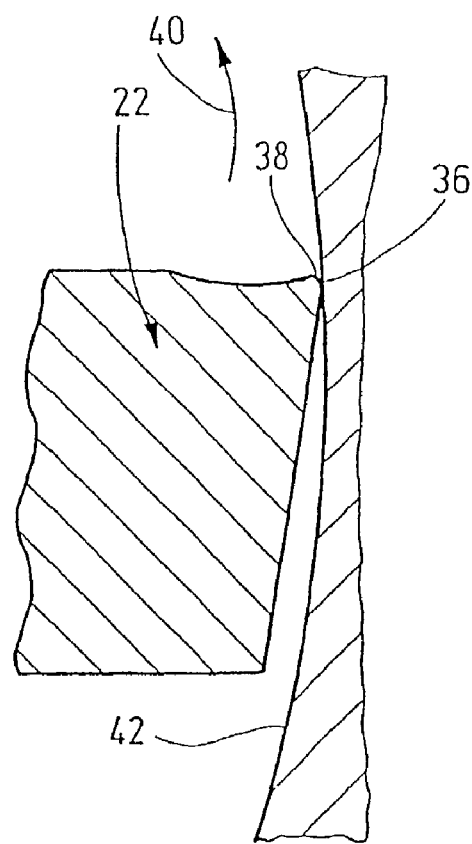
Fig.3c  Fig.3b  Fig.3a

SOLID DRILL BIT FOR MACHINE TOOLS

FIELD OF THE INVENTION

The invention relates to a boring tool for machine tools for drilling into solid material having a bit body and at least two movable inserts rectangular or square in contour arranged at a radial distance from one another and in a recess of the bit body in the area of a chip-conveying channel, project, with their front facing end major cutting edges axially beyond the bit body and radially overlap one another in their working area, whereby the radially outer movable insert projects radially beyond the periphery of the bit body with its outer rounded cutting edge corner and with its following minor cutting edge, which is perpendicular to the respective major cutting edge, and whereby the minor cutting edge is tilted starting out from the cutting edge corner in its longitudinal extent at a defined setting angle in direction of the bit body.

Boring tools of this type having two square movable inserts are known (DE-A-2843788). The two square inserts are arranged at different radial distances from one another. They project with their front facing end major cutting edges with a positive face angle axially beyond the bit body. They furthermore have in direction of rotation an angle different than 180°, whereby the inner insert runs there ahead of the outer insert in direction of rotation. The inner insert is pre-cut in axial direction, whereby the spacing corresponds approximately with the radius of curvature in the area of the cutting edge corners. The major cutting edge of the innermost insert does not project beyond the drill-bit axis. The inclination of the minor cutting edge of the outermost insert is chosen such that it rubs on the wall of the bore. In order to avoid frictional actions, the setting angle of the minor cutting edge is chosen to be at least 5°. The corresponding setting angle of the inserts, which are farther on the inside, is yet slightly greater, namely with the goal that an even load distribution occurs on the movable inserts.

SUMMARY OF THE INVENTION

The purpose of the invention is to improve the known solid drill bits of the above-disclosed type so that an increased exactness with at least the same metal-removing performance is achieved.

The inventive solution is primarily based on the thought that the minor cutting edge forms a guiding edge, which rests slidingly during the drilling operation under the action of a radially outwardly directed thrust force at least over a part of its length against the wall of the earlier created bore. In order to achieve this, it is suggested according to the invention that the setting angle of the minor cutting edge is smaller than 3.2°, preferably 1.2° to 2.2°. The minor cutting edge advantageously rests slidingly over more than 20%, preferably 30% to 60% of the length of its guiding edge against the wall of the bore. Most of all, in the case of the smallest possible setting angle, it is achieved at a given modulus of elasticity of the workpiece material that the minor cutting edge rests slidingly over the entire length of its guiding edge against the wall of the bore. The limit of the setting angle is achieved when a chip-removing frictional action occurs in the area of the minor cutting edge.

Since the minor cutting edge of a movable insert can through movement become a major cutting edge, particular attention must be paid that no wear occurs in the direct vicinity of the cutting edge. This can be avoided by forming the guiding edge through a land of the flank or curvature of the minor cutting edge. As an alternative, it is also possible to form the guiding edge through a face land or curvature of the minor cutting edge. The correct positioning of the movable insert in the tool can be recognized since during the drilling operation indeed in the area of the land of the flank or face land a material smoothing takes place at least over a part of the minor cutting edge length, not, however, in the direct area of the minor cutting edge. This phenomenon is a sign that the minor cutting edge rests slidingly with a partially elastic deformation and, if necessary, with a smoothing of unevennesses against the wall of the bore.

A further improvement in this respect is achieved when the movable inserts carry at least in the area of their major and minor cutting edges a friction-reducing, wear-resistant coat. The coat can consist, for example, of a material of the group titanium nitride, titanium carbonitride, aluminum nitride or aluminum oxide.

An advantageous development of the invention provides that the inner insert projects with its inner rounded cutting edge corner over the drill-bit axis. It is achieved with this measure that in the area of the inner and of the outer movable inserts chip chambers of approximately the same size are created, which chambers enlarge starting from the major cutting edge. It is assured in this manner that the relatively wide chips created during the drilling operation can be discharged through the chip-conveying channels without any danger of jamming.

The centering characteristics of the boring tool can be improved when the major cutting edge of the inner movable insert has a pre-cutting spacing from the major cutting edge of the outer movable insert, which is smaller than the corner radius, preferably smaller than 30% of the corner radius of the movable inserts. Expressed in absolute units of measurement, the pre-cutting spacing is less than 0.5 mm, preferably 0.15 to 0.3 mm.

To optimize the radially acting thrust forces, it is suggested according to a further advantageous development of the invention that the face angle of the major cutting edges of the inner movable insert is greater, preferably twice as large as the face angle of the outer movable insert.

To further optimize the radial thrust forces engaging the boring tool during the drilling operation, it is suggested according to a preferred development of the invention that the major cutting edge of the outer movable insert defines with the major cutting edge of the inner movable insert in direction of rotation about the drill-bit axis an angle which is smaller than 180°. It can in addition be achieved with this measure that in the area of the inner and of the outer movable inserts there exists an approximately equal cross-sectional opening of the chip-conveying channels.

The invention will be discussed in greater detail hereinafter in connection with one exemplary embodiment schematically illustrated in the drawings, in which:

FIG. 2a to 2c are a top view and two sectional side views of the solid drill bit according to FIG. 1;

FIG. 3a is a fragmentary cross-sectional illustration of the minor cutting edge of the outer movable insert of the boring tool according to FIGS. 1 and 2 with a guiding edge in the area of a land of the flank;

FIGS. 3b and 3c are each a fragment of FIG. 3a with a curvature and an additional land in the area of a flank of the minor cutting edge.

DETAILED DESCRIPTION

Figure 1:
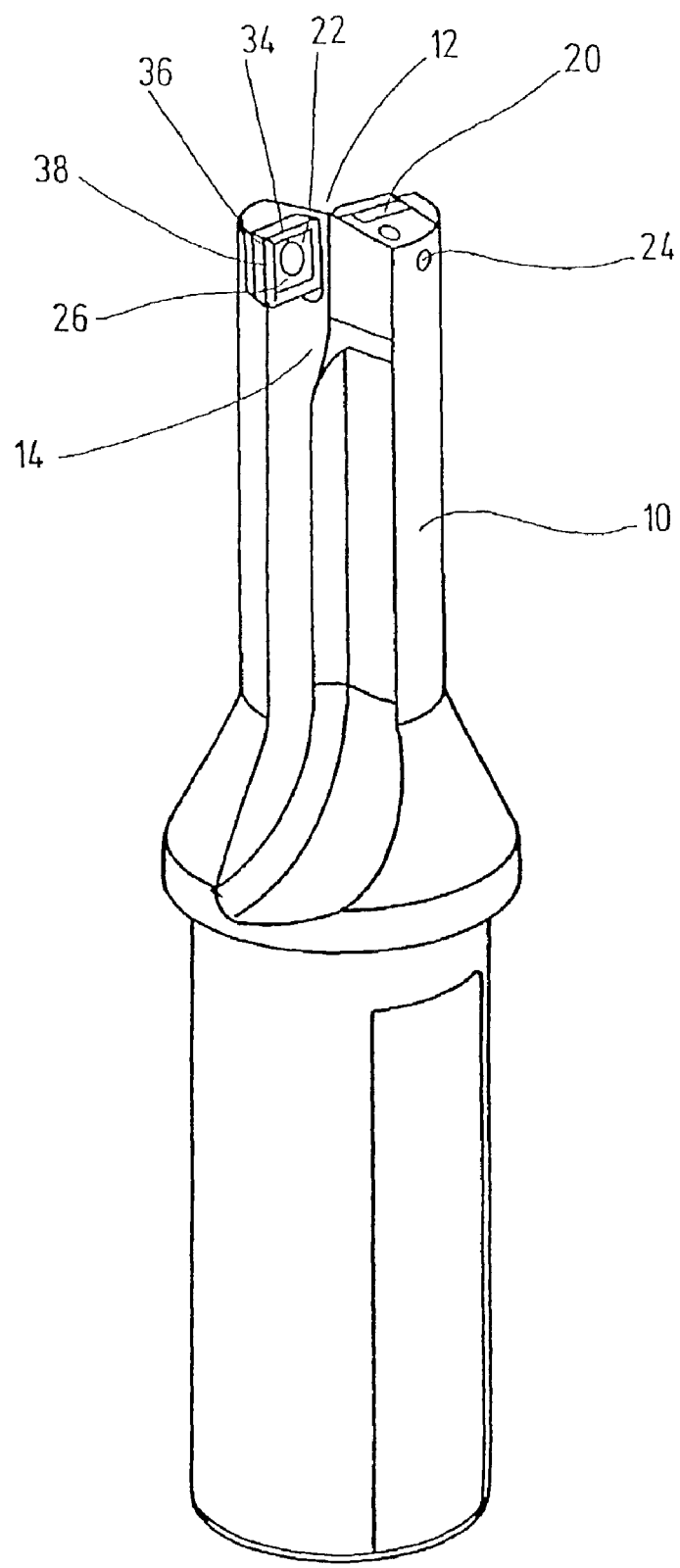
FIG. 1 is a diagrammatic illustration of a solid drill bit for machine tools having square movable inserts.

The tool illustrated in the drawings is designated as a solid drill bit for machine tools. It has an essentially cylindrical bit body 10 having two chip-conveying channels 12, 14. A recess 16, 18 is provided on the front facing end of each of the chip-conveying channels in order to receive a square movable insert 20, 22. Each of the movable inserts 20, 22 are fastened to the bit body 10 with a countersunk head screw 26 received in a taphole 24 in the bit body 10. As can be seen in FIGS. 2a to 2c, the inner movable insert 22 extends with the inner rounded cutting edge corner 28 on its front facing end major cutting edge 30 over the drill-bit axis 32, whereas the outer movable insert 22 projects with its major cutting edge 34 in the area of the outer rounded cutting edge corner 36 and with its outer minor cutting edge 38 beyond the periphery of the bit body 10. The movable inserts with their major and minor cutting edges are furthermore arranged tilted with respect to the bit body 10 in such a manner that the major cutting edges define a positive angle $\alpha_i = 4°$ or $\alpha_a = 2°$ with respect to a plane that is perpendicular with respect to the drill-bit axis, whereby the indices i and a identify the inner or outer insert. Since the minor cutting edge 38 is aligned perpendicularly with respect to the respective major cutting edge 34, the minor cutting edge 38 is in the illustrated exemplary embodiment inclined, starting from the cutting edge corner 36, in its longitudinal extent with a setting angle in direction of the bit body, which angle corresponds with the angle $\alpha_a$. FIG. 2a shows furthermore that the major cutting edge 34 of the outer movable insert 22 defines with the major cutting edge 30 of the inner movable insert 20 in the direction of rotation indicated by the arrow 40 about the drill-bit axis 32 an angle which is less by an amount of the angle $\beta$ than 180°. The angle $\beta$ is approximately 5° in the illustrated exemplary embodiment. Finally FIG. 2b shows that the major cutting edge 30 of the inner movable insert 20 has a pre-cutting spacing d from the major cutting edge 34 of the outer movable insert 22, which is less than the corner radius of the major cutting edges, and which in the illustrated exemplary embodiment is 0.23 mm. The angles $\alpha_i$, $\alpha_a$ and $\beta$ and the pre-cutting spacing d are chosen such that the drill bit rests slidingly with a defined radial thrust force in the area of its outer minor cutting edge 38 against the wall 42 of the created bore.

The minor cutting edge 38 has for this purpose a guiding edge 44, with which the outer movable insert 22 rests slidingly against the wall 42 of the bore. The guiding edge 44 is in the embodiment illustrated in FIG. 3b formed by a flank curvature of the minor cutting edge, whereas in the case of FIG. 3c it is formed by a land of the flank. The actual cutting edge of the minor cutting edge 38 is slightly shifted inwardly compared with the guiding edge 44 so that no wear in the direct vicinity of the minor cutting edge 38 occurs during the drilling operation. The guiding edge is merely smooth due to its sliding bearing against the wall of the bore. Due to the very small setting angle of the minor cutting edge 38 relative to the drill-bit axis 32, the minor cutting edge rests with its guiding edge 44 at least over a part of its length against the wall of the bore. The thrust forces are in this manner distributed over a larger surface so that metal removal does not occur in the area of the minor cutting edge but at most a smoothing of the wall of the bore. To improve the sliding action it is possible to provide the movable inserts with a friction-reducing coat, for example, of titanium nitride, titanium cabonitride, aluminum nitride or aluminum oxide.

The described arrangement of the movable inserts 20, 22 in the chip-conveying channels assures that a sufficient, slightly enlarging cross-sectional opening for the chips is formed, and that a strong base on the bit body 10 still remains for the movable inserts.

In summary, the following is to be stated: The invention relates to a solid drill bit for machine tools. The solid drill bit has a bit body 10 and two movable inserts 20, 22 each arranged at a radial distance from one another and in a respective insert seat 16, 18 of the bit body 10 in the area of a chip-conveying channel 12, 14. The movable inserts 20, 22 have a rectangular or square contour. Their front facing major cutting edges 30, 34 project axially beyond the bit body 10, and overlap one another radially in their working area. The radially outer movable insert 22 projects with its outer cutting edge corner 36 and with its following minor cutting edge 38, which is perpendicular to the respective major cutting edge 34, radially beyond the periphery of the bit body 10. The respective minor cutting edge 38 is furthermore inclined at a defined setting angle, which angle is less than 3.2°, starting out from the cutting edge corner 36 in its longitudinal extent in direction of the bit body 10. The minor cutting edge 38 has a guiding edge 44, with which it rests slidingly during the drilling operation under the action of a radially outwardly directed thrust force at least over a part of its length against the wall 42 of the created bore.

The invention claimed is:

1. A solid drill bit for machine tools with a bit body and at least two movable inserts, rectangular or square in contour, each arranged at a radial distance from one another and in a recess in the bit body in the area of a chip-conveying channel, project with their front facing end major cutting edges axially beyond the bit body, and radially overlap one another in their working area, wherein the radially outermost movable insert projects radially beyond the periphery of the bit body with its outer rounded cutting edge corner and with its following minor cutting edge, which is perpendicular to the respective major cutting edge, and wherein the respective minor cutting edge is inclined starting out from the cutting edge corner in its longitudinal extent at a defined setting angle ($\alpha_a$) of less than 3.2° in direction of the bit body, and wherein the minor cutting edge of the outermost movable insert comprises a guiding edge and an actual cutting edge which is shifted radially inwardly compared with the guiding edge so that the guiding edge rests slidingly during the drilling operation under the action of a radially outwardly directed thrust force at least over a part of its length against a wall of a created bore, and wherein the guiding edge is formed by at least one of a land of a flank and curvature of the minor cutting edge.

2. The solid drill bit according to claim 1, wherein the setting angle ($\alpha_a$) is 1.2° to 2.2°.

3. The solid drill bit according to claim 1, wherein the minor cutting edge of the outermost movable insert rests slidingly over more than 20% of the length of its guiding edge against the wall of the bore.

4. The solid drill bit according to claim 1, wherein the minor cutting edge of the outermost movable insert rests slidingly between 30% to 60% of the length of its guiding edge against the wall of the bore.

5. The solid drill bit according to claim 1, wherein the minor cutting edge rests slidingly over the entire length of its guiding edge against the wall of the bore.

6. The solid drill bit according to claim 1, wherein the minor cutting edge of the outermost movable insert rests slidingly against the wall of the bore under a partial elastic deformation.

7. The solid drill bit according to claim 1, wherein the minor cutting edge of the outermost movable insert rests slidingly against the wall of the bore while smoothing unevennesses.

8. The solid drill bit according to claim 1, wherein the innermost movable insert extends with its major cutting edge in the area of its inner rounded cutting edge corner over the drill-bit axis.

9. The solid drill bit according to claim 1, wherein the major cutting edge of the innermost movable insert has a pre-cutting spacing (d) from the major cutting edge of the outermost movable insert, which is smaller than the corner radius of the major cutting edge.

10. The solid drill bit according to claim 9, wherein the pre-cutting spacing (d) is less than 50% of the corner radius.

11. The solid drill bit according to claim 9, wherein the pre-cutting spacing (d) is from 0.15 to 0.3 mm.

12. The solid drill bit according to claim 1, wherein a face angle ($\alpha_a$) of the major cutting edge of the outermost movable insert is the same as the setting angle ($\alpha_a$) of the minor cutting edge due to the perpendicular orientation, wherein a face angle ($\alpha_a$) of the major cutting edge of the innermost movable insert is greater than the face angle ($\alpha_a$) of the major cutting edge of the outermost movable insert, and wherein the face angle ($\alpha_a$) of the major cutting edge of the outermost movable insert is constant along the entire length thereof.

13. The solid drill bit according to claim 12, wherein the face angle ($\alpha_a$) of the major cutting edge of the innermost movable insert is twice as large as the face angle ($\alpha_a$) of the major cutting edge of the outermost movable insert.

14. The solid drill bit according to claim 1, wherein the two movable inserts are provided so that the major cutting edge of the outermost movable insert defines with the major cutting edge of the innermost movable insert in direction of rotation about the drill-bit axis an angle which is smaller than 180°.

15. The solid drill bit according to claim 1, wherein the movable inserts carry at least in the area of their major and minor cutting edges a friction-reducing, wear-resistant coat.

16. The solid drill bit according to claim 15, wherein the coat consists of a material of the group titanium nitride, titanium carbonitride, aluminum nitride, and aluminum oxide.

17. The solid drill bit according to claim 1, wherein the major cutting edge of the innermost movable insert is tilted at a predetermined face angle ($\alpha_i$) with respect to a plane that is perpendicular with respect to the drill bit axis, the major cutting edge of the outermost movable insert has a constant angle along the entire length thereof, and the setting angle ($\alpha_a$) of less than 3.2° is constant along the entire length of the minor cutting edge.

18. The solid drill bit according to claim 17, wherein the major cutting edge of the innermost movable insert in the direction of rotation of the drill bit axis has a predetermined angle β and wherein the innermost movable insert has a pre-cutting spacing (d) from the major cutting edge of the outermost movable insert which is less than the corner radius of the major cutting edges, and wherein the face angle ($\alpha_i$), the predetermined angle β, the spacing (d), and the setting angle ($\alpha_a$) are chosen such that the drill bit rests slidingly with a defined radial thrust force in the area of its outer minor cutting edge against a wall of a created bore.

19. A solid drill bit for machine tools comprising:

a bit body having a cutting end, the bit body including:
  first and second chip conveying channels extending to the cutting end;
  a first recess opening in an area of the first chip conveying channel adjacent the cutting end; and
  a second recess opening in an area of the second chip conveying channel adjacent the cutting end;

a radially innermost movable insert that is rectangular or square in contour and that is mounted in the first recess, the innermost movable insert having a front facing major cutting edge projecting axially beyond the cutting end of the bit body, the major cutting edge of the innermost movable insert having a pre-cutting spacing (d) from the major cutting edge of the outermost movable insert that is smaller than a corner radius of the major cutting edge; and a radially outermost movable insert that is rectangular or square in contour and mounted in the second recess, the outermost movable insert being mounted radially from the innermost movable insert, wherein a working area of the outermost movable insert overlaps a working area of the innermost movable insert, the outermost movable insert comprising:
  a front facing major cutting edge projecting axially beyond the cutting end of the bit body;
  a minor cutting edge that is perpendicular to the major cutting edge and that projects radially outwardly beyond the periphery of the bit body, the minor cutting edge including:
    a guiding edge comprising at least one of a land of a flank and a curvature of the minor cutting edge; and
    a separate actual cutting edge that is shifted radially inwardly with respect to the guiding edge; and
  an outer rounded cutting edge corner joining the major cutting edge and the minor cutting edge, the minor cutting edge being inclined starting out from the cutting edge corner in its longitudinal extent at a defined setting angle that is 1.2° to 3.2° in a longitudinal direction of the bit body, wherein a face angle ($\alpha_a$) of the major cutting edge of the innermost movable insert is greater than a face angle ($\alpha_a$) of the major cutting edge of the outermost movable insert, and wherein the guiding edge rests slidingly during a drilling operation under the action of a radially outwardly directed thrust force at least over a part of its length against a wall of a created bore so that the actual cutting edge of the minor cutting edge remains free from wear, whereby after movement of the outermost insert so that the actual cutting edge functions as the major cutting edge, the actual cutting edge is free from wear before a drilling operation begins.

* * * * *